(12) United States Patent
Zeng et al.

(10) Patent No.: US 10,826,035 B2
(45) Date of Patent: Nov. 3, 2020

(54) FIXING FRAME AND BATTERY PACK

(71) Applicant: Contemporary Amperex Technology Co., Limited, Ningde (CN)

(72) Inventors: Xin Zeng, Ningde (CN); Xiaoshan Dai, Ningde (CN); Lei Yang, Ningde (CN); Qiqi Huo, Ningde (CN); Shoujiang Xu, Ningde (CN); Chunyan Feng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 68 days.

(21) Appl. No.: 16/236,424

(22) Filed: Dec. 29, 2018

(65) Prior Publication Data

US 2019/0393458 A1    Dec. 26, 2019

(30) Foreign Application Priority Data

Jun. 20, 2018 (CN) .................... 2018 2 0950730 U

(51) Int. Cl.
   *H01M 2/10*       (2006.01)
(52) U.S. Cl.
   CPC ....... *H01M 2/1077* (2013.01); *H01M 2/1061* (2013.01)
(58) Field of Classification Search
   None
   See application file for complete search history.

(56) References Cited

U.S. PATENT DOCUMENTS

| 2017/0012330 A1 | 1/2017 | Kim et al. |
| 2017/0225558 A1 | 8/2017 | Newman et al. |
| 2017/0305249 A1* | 10/2017 | Hara .................. H01M 2/1077 |

FOREIGN PATENT DOCUMENTS

| CN | 105098112 A | 11/2015 |
| CN | 106486622 A | 3/2017 |
| EP | 1992513 A1 | 11/2008 |
| JP | 2010244877 A | 10/2010 |

OTHER PUBLICATIONS

The extended European search report dated Jul. 26, 2019 for European Application No. 18215243.9, 7 pages.

* cited by examiner

*Primary Examiner* — Yoshitoshi Takeuchi
(74) *Attorney, Agent, or Firm* — Law Offices of Liaoteng Wang

(57) ABSTRACT

The present disclosure relates to a fixing frame and a battery pack. The fixing frame comprises a top connecting frame comprising two or more fixing plates spaced apart from each other in a first direction and a connecting component connecting the two adjacent fixing plates, the connecting component comprising a recess portion and an adapter portion, the recess portion being recessed in a second direction and the adapter portion being connected to both sides of the recess portion in the first direction, and the connecting component being connected to the two adjacent fixing plates via the adapter portion; and locking plates provided on the top connecting frame and extending along the second direction, the locking plate comprising in the second direction a first end connected to the top connecting frame and a second end connectable to an external structural member; wherein the first direction intersects the second direction.

9 Claims, 6 Drawing Sheets

ND BATTERY PACK

FIXING FRAME AND BATTERY PACK

CROSS-REFERENCE TO RELATED APPLICATIONS

The application claims priority to the Chinese Patent Application No. 201820950730.1, filed Jun. 20, 2018, the disclosure of which is incorporated herein by reference in its entirety.

TECHNICAL FIELD

The present disclosure relates to the technical field of a battery, in particular to a fixing frame and a battery pack.

BACKGROUND

In the related art, a battery system can be divided into a battery pack, a battery module and a single battery according to a system hierarchy from high to low. In most of battery modules produced by domestic and foreign lithium battery manufacturers, the single battery is the smallest unit. That is to say, a single battery is produced at first, two or more single batteries are assembled into a battery module through a series or parallel connection of electrical connectors, and a battery pack is composed of two or more battery modules through a series or parallel connection of electrical connectors.

In order to ensure stable operation of the battery pack, the battery module inside the battery pack needs to be fixed to the case of the battery pack. In the prior art, the battery module is generally fixed by a connection of a frame structure of the battery pack to the case of the battery pack, or multiple battery modules inside the battery pack can be fixed to the case of the battery pack by an external fixing structure. Although the above two forms can meet fixed requirements of the battery module to a certain extent, there are corresponding safety hazards. Particularly, when the battery pack is impacted, an impact force will be transmitted between the battery modules, thereby damaging multiple battery modules and affecting safety performance and service life of the battery pack Therefore, there is a need for a fixing frame and a new battery pack.

SUMMARY

Embodiment of the present disclosure provides a fixing frame and a battery pack. The fixing frame can fix a battery module of the battery pack to a case thereof to prevent an impact force from being transmitted between multiple battery modules inside the battery pack, thereby effectively avoiding damage to multiple battery modules and ensuring safety performance and service life of the battery pack.

A frame structure of the battery module vibrates up and down to ensure reliability of an electrical connection of a single battery, thereby ensuring safety performance of the battery pack.

In an aspect, an embodiment of the present disclosure provides a fixing frame for fixing a battery module, the fixing frame comprising: a top connecting frame comprising two or more fixing plates spaced apart from each other in a first direction and a connecting component connecting the two adjacent fixing plates, the connecting component comprising a recess portion and an adapter portion connected to each other, the recess portion being recessed in a second direction and the adapter portion being connected to both sides of the recess portion in the first direction, and the connecting component being connected to the two adjacent fixing plates via the adapter portion; and locking plates provided on both sides of the top connecting frame in the first direction and extending along the second direction, the locking plate comprising a first end and a second end in the second direction, and the first end being connected to the top connecting frame and the second end being connectable to an external structural member; wherein the first direction intersects the second direction.

According to an aspect of an embodiment of the present disclosure, the recess portion comprises a bottom plate and side plates, the side plates are spaced apart from each other in the first direction and connected to the bottom plate, the adapter portion has a plate-like structure and is connected to the side plate, and the bottom plate is connectable to the external structural member.

According to an aspect of an embodiment of the present disclosure, the connecting component further comprises a reinforcing portion, the reinforcing portion is connected to the side plate, and the reinforcing portion, the bottom plate and the side plates enclose a buffer space.

According to an aspect of an embodiment of the present disclosure, the connecting component further comprises a buffer portion, and the buffer portion is a deformable buffer body filled in the buffer space.

According to an aspect of an embodiment of the present disclosure, the connecting component further comprises a buffer portion, and the buffer portion is a bent body formed by the side plate bending in the second direction.

According to an aspect of an embodiment of the present disclosure, the bottom plate and the second end are in the same plane, the bottom plate is provided with a first connecting hole through the bottom plate in the second direction, and the second end is provided with a second connecting hole through the second end in the second direction.

According to an aspect of an embodiment of the present disclosure, at least one of the top connecting frame and the locking plate is provided with a lightening hole and/or a reinforcing rib.

In an another aspect, an embodiment of the present disclosure provides a battery pack, comprising: a case comprising a receiving cavity and a side wall enclosing the receiving cavity; a battery module provided in the receiving cavity; the above fixing frame, wherein the top connecting frame is pressed against the battery module, the locking plate is connected to the side wall by the second end, and the connecting component is located between two adjacent battery modules to separate two adjacent battery modules.

A gap is reserved between the connecting component and an adjacent battery module, and/or there is a gap between the locking plate and adjacent battery module.

According to another aspect of an embodiment of the present disclosure, the length of the fixing frame in a third direction is greater than or equal to one third of the length of the battery module in the third direction, and the third direction is perpendicular to both the first direction and the second direction.

Embodiments of the present disclosure provide a fixing frame and a battery pack. The fixing frame comprises a top connecting frame and a locking plate. The top connecting frame comprises two or more fixing plates spaced apart from each other in a first direction and a connecting component connecting the two adjacent fixing plates, the connecting component comprises a recess portion and an adapter portion connected to each other, the recess portion is recessed in the second direction intersecting the first direction, and the connecting component is connected to the two adjacent fixing plates by the adapter portion. The locking plate extends along the second direction. When the fixing frame is applied to a battery pack, the top connecting frame is pressed against the battery module and fixedly connected to the side wall of the case through the second end of the locking plate. Therefore, a battery module of a battery pack is fixed to the case to ensure reliability of connection between the battery module of the battery pack and the case. At the same time, the recess portion of the connecting component can be provided between the adjacent two battery modules to separate the adjacent two battery modules, so that when the battery pack itself is partially impacted, the recess portion can prevent the mutual impact between the two adjacent battery modules, and prevent the impact force from being transmitted between multiple battery modules inside the battery pack, thereby effectively preventing damage to multiple battery modules and ensuring safety performance and service life of the battery pack.

BRIEF DESCRIPTION OF THE DRAWINGS

Features, advantages, and technical effects of exemplary embodiments of the present disclosure will be described below with reference to the drawings.

Figure 1:
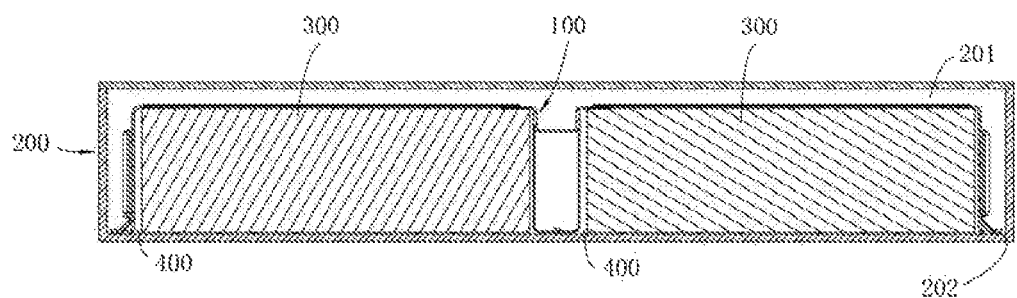
FIG. 1 is a cross-sectional view of a battery pack of an embodiment of the present disclosure.

X—first direction; Y—second direction; Z—third direction;
100—fixing frame; 101—top connecting frame;
10—fixing plate; 11—lightening hole;
20—connecting component; 21—recess portion; 211—bottom plate; 212—side plate; 213—first connecting hole; 22—adapter portion; 23—reinforcing portion; 24—buffer space; 25—buffer portion;
30—locking plate; 31—first end; 32—second end; 321—second connecting hole; 33—reinforcing rib;
200—case; 201—receiving cavity; 202—side wall;
300—battery module; 301—end plate;
400—gap.

In the drawings, the same components are denoted by the same reference numbers. The drawings are not drawn to scale.

DETAILED DESCRIPTION

Features and exemplary embodiments of various aspects of the present disclosure are described in detail below. In the following detailed description, numerous specific details are set forth to provide a comprehensive understanding of the present disclosure. However, it will be apparent to those skilled in the art that the present disclosure may be practiced without some of these details. The following description of embodiments is merely provided to provide a better understanding of the present disclosure by examples of the present disclosure. In the drawings and the following description, at least some of common structures and techniques are not shown in order to avoid unnecessary obscuring of the present disclosure. Furthermore, for clarity, dimensions of some of structures may be exaggerated. Furthermore, features, structures, or characteristics described hereinafter may be combined in any suitable manner in one or more embodiments.

The orientation words appearing in the following description are directions shown in the drawings, and are not intended to limit a specific structure of the fixing frame and the battery pack of the present disclosure. In the description of the present disclosure, it should be noted that the terms "installation" and "connection" are to be understood broadly, and may be, for example, a fixed connection or a detachable connection or an integral connection, a direct connection or an indirect connection, unless otherwise explicitly stated and defined. For those skilled in the art, the specific meanings of the above terms in the present disclosure can be understood according to specific cases.

Figure 2:
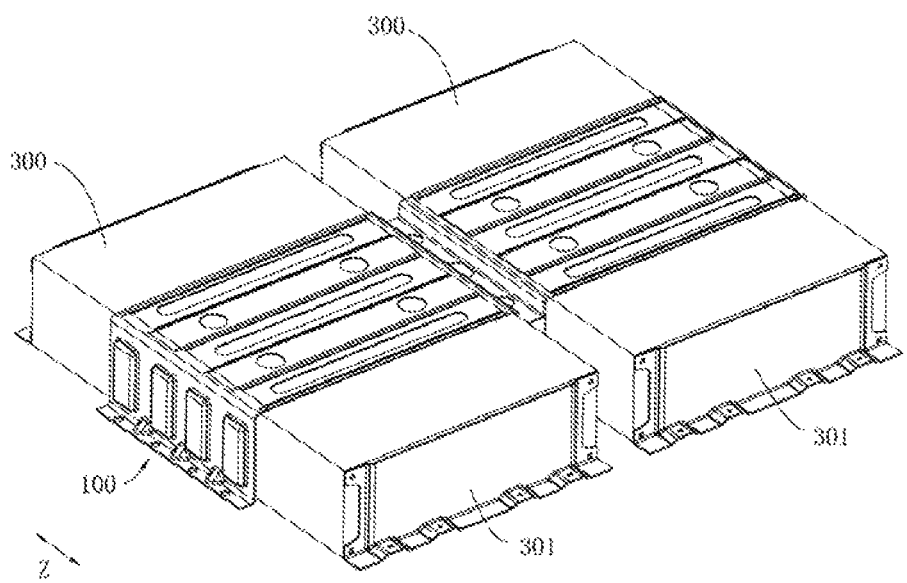
FIG. 2 is a schematic view of fitting between a fixing frame and a battery module.
Figure 3:
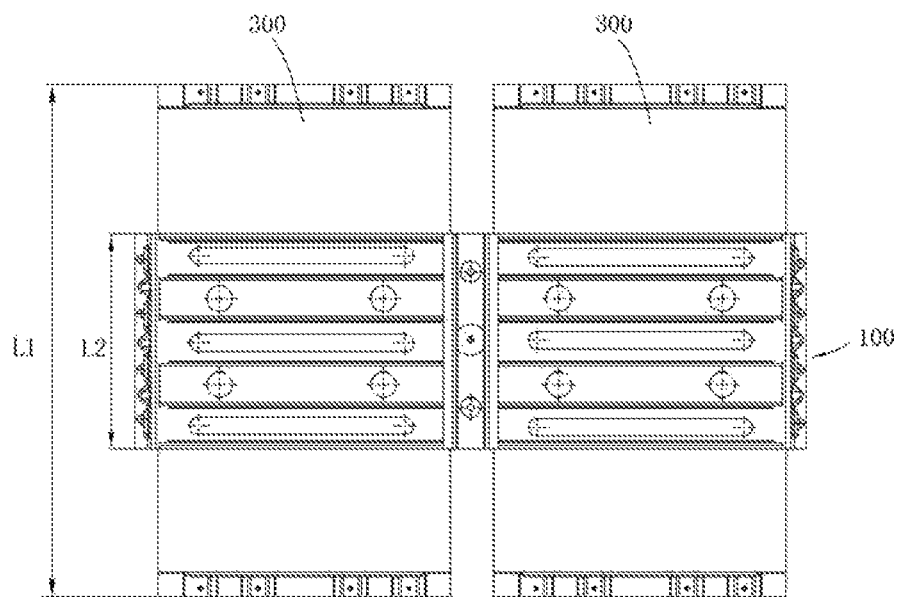
FIG. 3 is a top view of the structure shown in FIG. 2.

FIG. 1 is a cross-sectional view of a battery pack of an embodiment of the present disclosure, FIG. 2 is a schematic view of fitting between a fixing frame and a battery module; and FIG. 3 is a top view of the structure shown in FIG. 2.

Referring to FIG. 1, FIG. 2 and FIG. 3, an embodiment of the present disclosure provides a battery pack, including a case 200, a battery module 300, and a fixing frame 100 provided by an embodiment of the present disclosure. The case 200 includes a receiving cavity 201 and side wall forming the receiving cavity. The battery module 300 is provided in the receiving cavity 201, and the fixing frame 100 is pressed against the battery module 300 and connected to the side wall 202 of the case 200 to fix the battery module 300 to the case. An end plate 301 of the battery module 300 is preferably also connected to the side wall 202 of the case 200 in order to ensure connection strength between the battery module 300 and the case 200.

Figure 4:
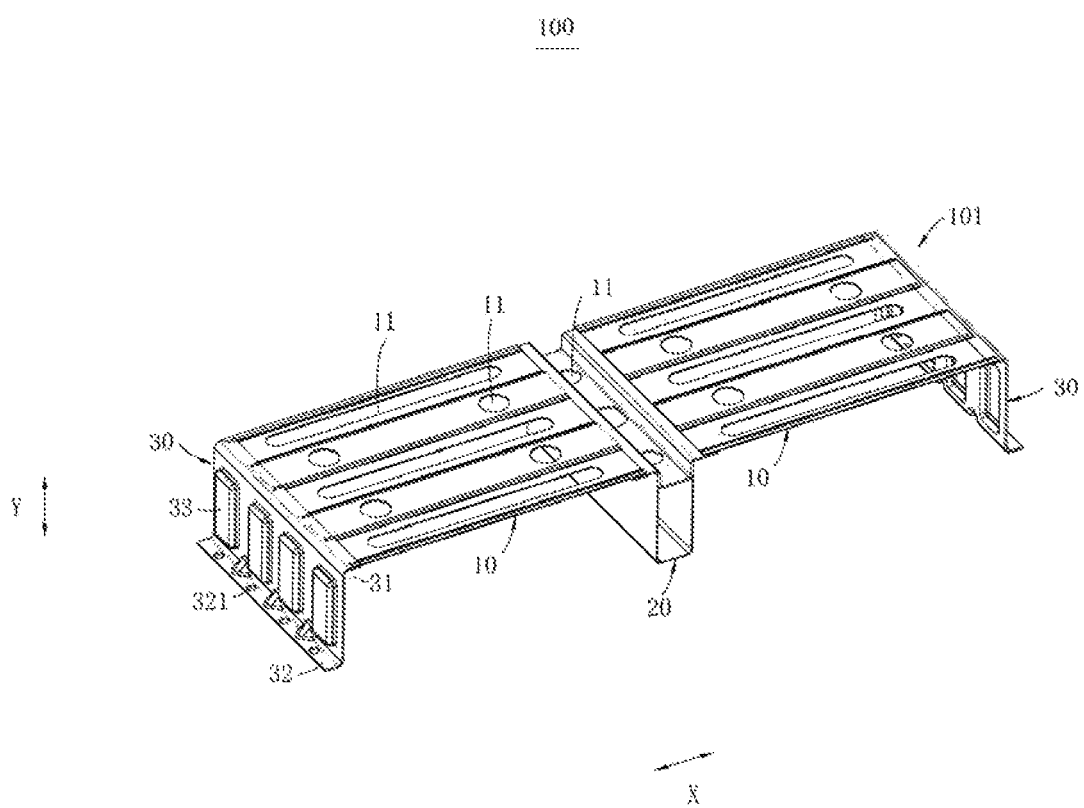
FIG. 4 is a isometric view of a fixing frame according to an embodiment of the present disclosure.
Figure 5:
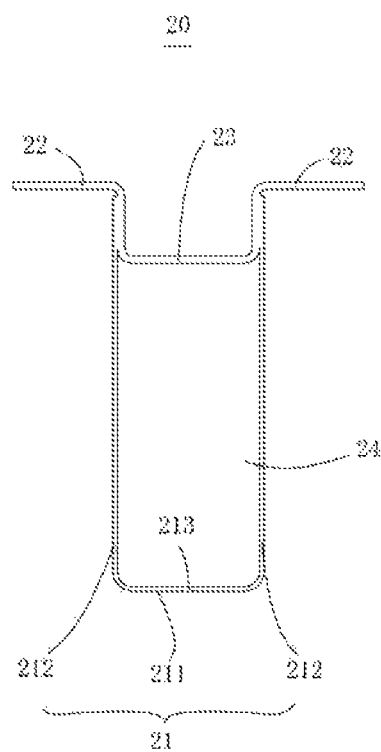
FIG. 5 is a schematic structural view of an embodiment of a connecting component according to an embodiment of the present disclosure.

FIG. 4 is an isometric view of a fixing frame 100 according to an embodiment of the present disclosure, and FIG. 5 is a schematic structural view showing an embodiment of a connecting component according to an embodiment of the present disclosure.

Referring to FIGS. 4 and 5, the fixing frame 100 includes a top connecting frame 101 and a locking plate 30. The top connecting frame 101 extends in a first direction X. The locking plate 30 is provided on both sides of the top connecting frame 101 in the first direction X and extending along the second direction Y. The locking plate 30 includes a first end 31 and a second end 32 in the second direction Y, the first end 31 is connected to the top connecting frame 101 and the second end 32 is connectable to an external structural member. The first direction X intersects the second direction Y. The fixing frame 100 can be pressed against the battery module 300 through the top connecting frame 101 and connected to the side wall 202 of the case 200 through the second end 32 thereof to fix the battery module 300.

In one example, the top connecting frame 101 preferably includes a fixing plate 10 and a connecting component 20. The number of the fixing plates 10 is two or more, and the two or more fixing plates 10 are spaced apart from each other in the first direction X. The connecting component 20 is used for connecting adjacent two fixing plates 10, and the connecting component 20 and the fixing plate 10 are alternately connected in the first direction X to form the top connecting frame 101.

The number of the fixing plates 10 in the embodiment is preferably two, and the two fixing plates 10 have the same shape and are rectangular plates. The two fixing plates 10 are spaced apart from each other in the first direction X. The distance between the two fixing plates and the size of each of the fixing plates 10 in the first direction X are not limited to specific values as long as fixing requirements for the battery module can be satisfied.

In one example, the connecting component 20 includes a recess portion 21 and an adapter portion 22 that are connected to each other. The recess portion 21 is recessed in the second direction Y and the adapter portion 22 is connected to both sides of the recess portion 21 in the first direction X. The connecting component 20 is connected to the adjacent two fixing plates 10 through the adapter portion 22. When the fixing frame 100 is applied to the battery pack to fix the battery module 300, the fixing plate 10 can be provided in one-to-one correspondence with the battery module 300, and the recess portion 21 can be located between the adjacent two battery modules 300, in order to separate the battery modules 300 from each other, and when the battery pack is partially impacted, the recess portion 21 can block collision between the adjacent two battery modules 300, thereby reducing damage to the battery module 300 and ensuring security of the battery pack.

As an optional embodiment, the recess portion 21 preferably includes a bottom plate 211 and side plates 212. The side plates 212 are spaced apart from each other in the first direction X and connected to the bottom plate 211. The number of the side plates 212 is preferably two, the adapter portion 22 has a plate-like structure and is connected to the two side plates 212, and the bottom plate 211 can be connected to an external structural member. The recess portion 21 adopts the above structure, so that when the battery module 300 is fixed by the fixing frame 100, in addition to the second end 32 of the locking plate 30, the fixing frame 100 can be connected to the external structural member through the bottom plate 211, thereby increasing connection point with the external structural member and improving fixing strength of the battery module 300.

As an alternative embodiment, the bottom plate 211 and the second end 32 are in the same plane. That is to say, preferably, the recess depth of the recess portion 21 in the second direction Y is the same as the extending length of the locking plate 30 in the second direction Y. The bottom plate 211 is provided with a first connecting hole 213 through the bottom plate 211 in the second direction Y, and the second end 32 is provided with a second connecting hole 321 through the second end 32 in the second direction Y, so that the second end 32 and the bottom plate 211 can be connected to the external structural member by means of a fastener locking manner. Therefore, the recess portion 21 does not shift upward when being pressed by the module 300 to separate from the area between the two modules 300.

In some optional embodiments, the number of the locking plates 30 is two and are respectively connected to the two sides of the top connecting frame 101 in the first direction X, and the locking plate 30 has a rectangular plate-like structure extending in the second direction Y. The angle between the second direction Y and the first direction X may be an obtuse angle. Of course, it is preferably a right angle, that is, the second direction Y and the first direction X are perpendicular to each other. The first end 31 and the second end 32 of the locking plate 30 may be a plate body extending in the second direction Y, and connected to the top connecting frame 101 and the external structural member by welding or the like.

Of course, the first end 31 and the second end 32 may also has a plate-like structure formed by the locking plate 30 bending in the first direction X. The first end 31 and the second end 32 are extending in opposite directions along the first direction X, and may be connected to the corresponding top connecting frame 101 and the external structural member by welding, bonding or fastener locking. The external structural member may be the battery case 200 to fix the battery module 300.

Figure 6:
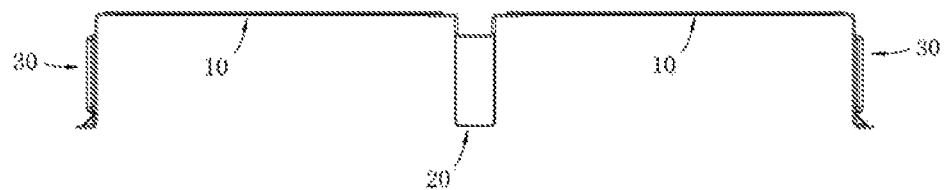
FIG. 6 is a front view of the structure of FIG. 4 in a normal state.
Figure 7:
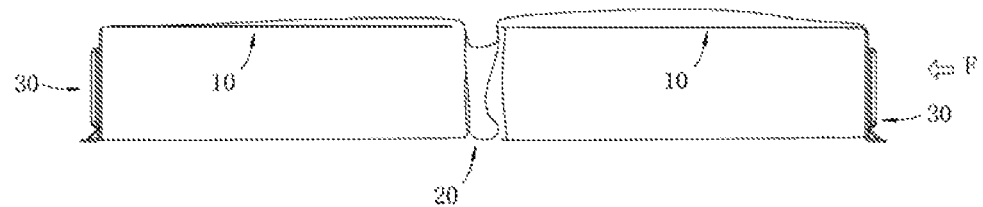
FIG. 7 is a front view of the structure of FIG. 4 after being subjected to an impact force.

FIG. 6 is a front view showing the structure of FIG. 4 in a normal state, and FIG. 7 is a front view showing the structure shown in FIG. 4 after being subjected to an impact force. Referring to FIGS. 6 and 7, the two side plates 212 included in the recess 21 can be used for respectively fixing the battery modules 300 adjacent thereto. The two side plates 212 are spaced apart from each other in the first direction X, so that when the battery pack is impacted, the bottom plate 211 and the side plate 212 of the recess portion are deformed and absorb most of the impact force, i.e., absorb the main energy subjected by the battery pack. Therefore, a part of the collision energy is shared for the battery module 300, thereby reducing deformation amount of the battery module 300 caused by force, reducing the degree of damage caused by press to the single battery, and avoiding accidents such as thermal runaway and even fire and explosion caused by short circuit in the single battery.

As an alternative embodiment, the connecting component 20 further includes a reinforcing portion 23. The reinforcing portion 23 is connected to the two side plates 212 and forms a buffer space 24 together with the bottom plate 211 and the side plates 212. The reinforcing portion 23 can improve the overall bearing capacity of the connecting component 20, and the buffer space 24 is formed to provide a better cushioning effect for the connecting component 20, which can share more impact force when the battery pack is subjected to an impact.

In a specific implementation, the reinforcing portion 23 is a strip-shaped plate, and the reinforcing portion 23 and the two side plates 212 of the recess portion 21 can intersect. Of course, it is preferably vertical, that is, the reinforcing portion 23 and the bottom plate 211 of the recess portion 21 are in the second direction Y and are arranged parallel to each other and spaced apart. The buffer space 24 formed is a regular rectangular space, so that the force is uniformly distributed on the connecting component 20, and the bearing effect is better ensured. The number of the reinforcing portions 23 may be one, or two or more, and the number is not limited as long as the cushioning effect of the connecting component 20 can be ensured and meanwhile the overall bearing capacity of the connecting component 20 can be improved.

Figure 8:
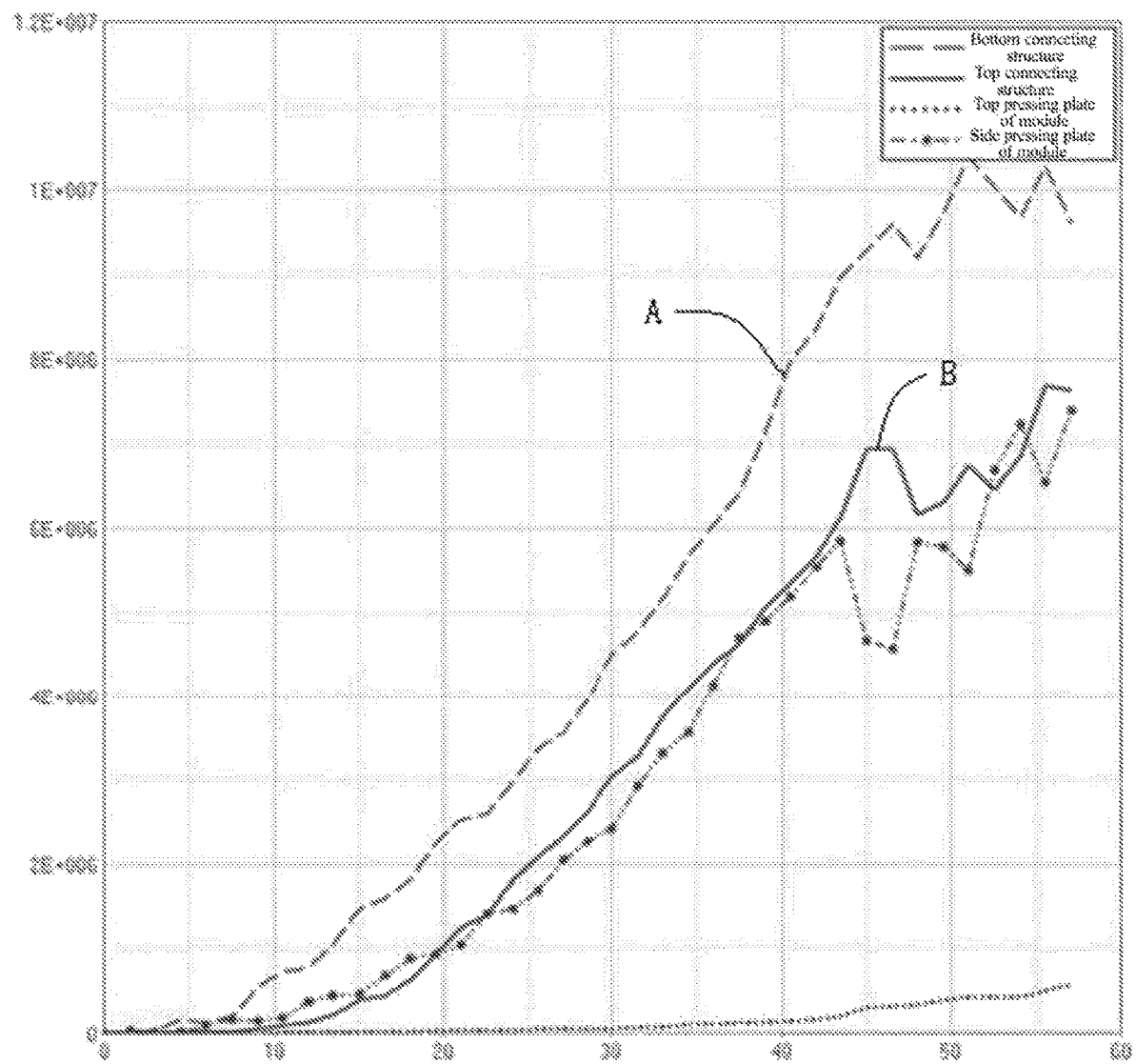
FIG. 8 is a diagram showing an energy distribution of the structure shown in FIG. 4 when subjected to an impact force.

Therefore, the recess portion 21 can be an integral structure when the connecting component 20 is molded. The reinforcing portion 23 is connected to the two side plates 212 of the recess portion 21 by welding, of course, without being limited thereto. Preferably, the connecting component 20 is better formed when the reinforcing portion 23, the portion of the side plate 212 of the recess portion 21 located above the reinforcing portion 23 in the second direction Y, and the adapter portion 22 form an integral structure to form the top connecting structure together. The portion of the side plate 212 of the recess portion 21 located below the reinforcing portion 23 in the second direction Y and the bottom plate 211 thereof are an integral structure and form a bottom connecting structure together, which is more convenient for forming the connecting component 20 and the cushioning effect for the impact force is better. As shown in FIG. 8. FIG. 8 shows the energy distribution diagram of the fixing bracket 100 shown in FIG. 4 when subjected to the impact force F, wherein the abscissa represents time and the ordinate represents energy. When the fixing frame 100 is subjected impact force F in the illustrated direction, the connecting component 20 is pressed and deformed, and the connecting component 20 absorbs the main energy during the entire pressing process, such as shown in the curve A (bottom connecting structure) and the curve B (the top connecting structure), which provides a better absorption effect on the impact force and better protects the battery module while being fixed.

Figure 9:
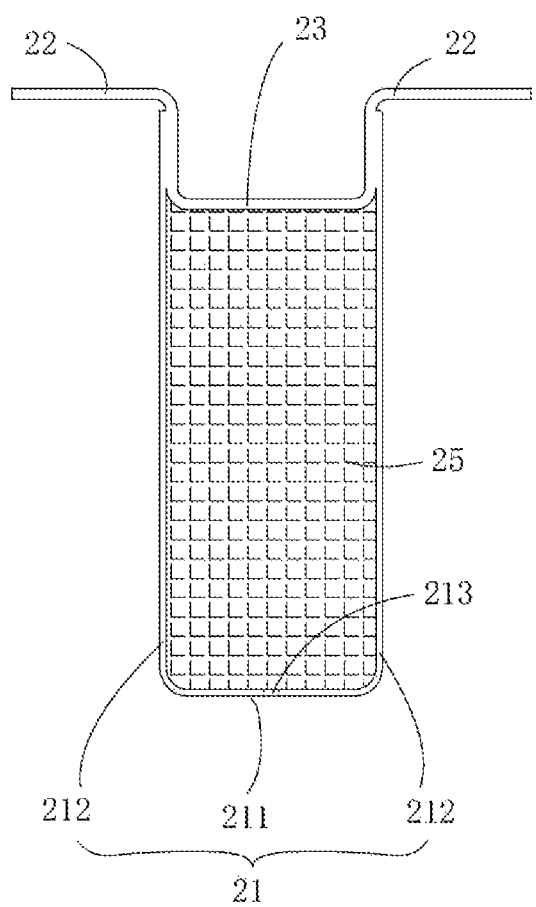
FIG. 9 is a schematic structural view of another embodiment of a connecting component according to an embodiment of the present disclosure.

FIG. 9 is a schematic view showing the structure of another embodiment of the connecting component 20 of the embodiment of the present disclosure. Referring to FIG. 9, as an optional embodiment, the connecting component 20 further includes a buffer portion 25. By providing the buffer portion 25, the ability of the connecting component 20 to share the impact force can be further improved. In a specific implementation, the buffer portion 25 can adopt the form shown in FIG. 9, that is, the buffer portion 25 is a deformable buffer body filled in the buffer space 24. The deformable buffer body can be a deformable flexible body such as foam. The body is of course not limited to the foam body, and may be a rubber body or the like. Of course, the body such as a spring may be used as long as the cushioning ability of the connecting component 20 can be further improved.

Figure 10:
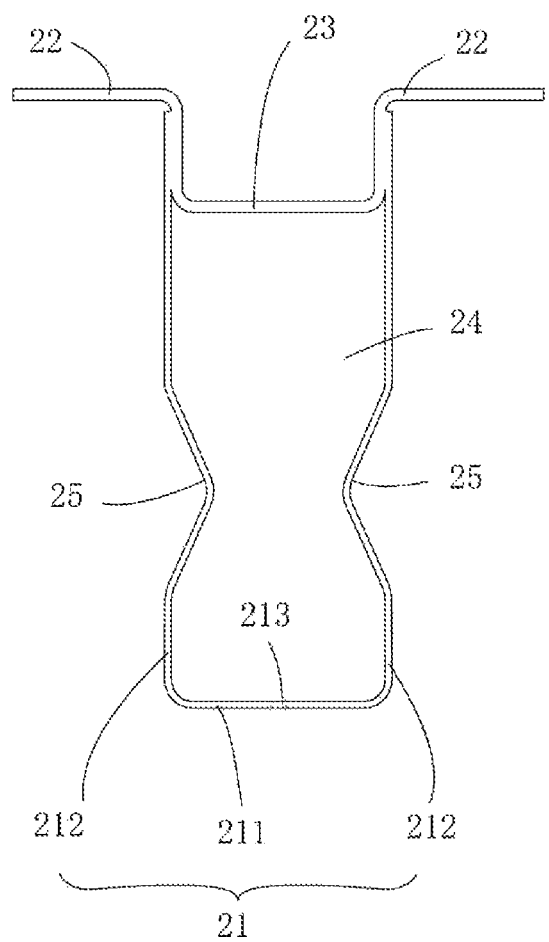
FIG. 10 is a schematic structural view of another embodiment of a connecting member according to an embodiment of the present disclosure.

FIG. 10 is a schematic view showing the structure of another embodiment of the connecting component 20 of the embodiment of the present disclosure. The structure of the buffer portion 25 in the connecting component 20 shown in FIG. 9 is only an alternative embodiment. In one example, as shown in FIG. 10, the buffer portion 25 may also be a bent body formed by the side plate 212 bending in the second direction Y. That is to say, the bent body is shown as the triangular buffer area shown in the figure, of course, may also be a curved buffer area. The number is not limited to one, that is, not limited to one triangular or curved buffer area, and may be more than two buffers. When there are two or more buffer regions on each of the side plates 212, two or more buffer regions may be continuously provided, of course, may be spaced apart from each other, and may have the same shape, or may be a combination of different shapes, as long as the buffering ability of the connecting component 20 can be further improved.

Optionally, on the basis of the structure shown in FIG. 10, the deformable buffer body can also be filled in the buffer space 24 to achieve a better buffering effect.

As an optional implementation manner, since the fixing frame 100 is used for a battery pack, the impact force it receives may be very large. Therefore, in order to increase the strength of the fixing frame 100, as shown in FIG. 4, the locking plate 30 of the fixing frame 100 is provided with a reinforcing rib 33. The reinforcing rib 33 can be a rib fixedly connected to the locking plate 30. On the basis of ensuring the strength of the fixing frame 100, in order to reduce the weight of the fixing frame 100, the reinforcing rib 33 is preferably a convex portion formed by punching the lock plate 30 in the first direction X. Of course, the reinforcing ribs 33 are not limited to being provided on the locking plate 30 of the fixing frame 100. To ensure the strength requirement, the reinforcing ribs 33 may be provided on the connecting component 20 and/or the locking plate 30 of the top connecting frame 101.

At the same time, in order to minimize the influence on the energy density of the battery pack when the fixing bracket 100 is applied to the battery pack, as an optional embodiment, the fixing frame 100 is further provided with a lightening hole 11. The lightening hole 11 may be provided on the fixing plate 10 and the connecting component 20, i.e., the top connecting frame 101. The shape of the lightening hole 11 is not specifically limited, and may be circular, elliptical, waist-shaped or other irregular holes, as long as it can meet the lightening requirement without affecting the strength requirement of the fixing frame 100. It can be understood that the lightening hole 11 is not limited to be provided on the fixing plate 10 and the connecting component 20, and may be provided on the locking plate 30 and adjusted according to specific conditions.

Each of the above embodiments is an example in which the fixing frame 100 includes only two fixing plates 10. It can be understood that, for example, the number of the fixing plates 10 is not limited to two, three, four or even more, and can be set according to the number of battery modules that need to be fixed.

The fixing frame 100 provided by the embodiment of the present disclosure can be applied to the battery pack and used to fix the battery module 300. In use, the top connecting frame 101 is pressed to the battery module 300 and fixedly connected to the battery case 200 through the second end 32 of the locking plate 30, thereby fixing the battery module 300 and the case 200 and ensuring the reliability of the connection between the battery module 300 and the casing 200 thereof. The recess portion 21 of the connecting component 20 can be provided between the adjacent two battery modules 300 to separate the adjacent two battery modules 300 so that when the battery pack is partially impacted, the recess portion 21 can block the mutual impact between the two adjacent battery modules 300, thereby preventing the impact force from being transmitted between multiple battery modules 300 inside the battery pack and effectively avoiding multiple battery modules 300 being damaged to ensure the safety performance and service life of the battery pack.

Continuing to refer to FIGS. 1 to 10, as an alternative embodiment, there are preferably multiple battery modules 300 included in the battery pack of the embodiment of the present disclosure and they are spaced apart from each other in the receiving cavity 201. A gap 400 is reserved between the connecting component 20 and the adjacent two battery modules 300. Preferably, a gap is reserved between the side plate 212 of the connecting component 20 and the adjacent two battery modules 300. At the same time, a gap 400 is preferably reserved between the locking plate 30 and the adjacent battery module 300. By the gap 400, the battery pack can further provide a buffer gap when the impact force is applied, so that the fixing frame 100 can absorb more force, so that battery module 300 is prevented from being damaged and the safety of the battery pack is further ensured. At the same time, the gap 400 makes it easier for the fixing frame 100 to be assembled when the battery module 300 is fixed.

In order to ensure reliability of the protection and the energy absorption effect by the fixing frame 100 to the battery module 300, in some optional embodiments, the length L2 of the fixing frame 100 in a third direction Z is greater than or equal to one third of the length L1 of the battery module 300 in the third direction. The third direction Z is perpendicular to the first direction X and the second direction Y.

As the fixing frame 100 of any one of above embodiments is included, the battery pack provided by the embodiment of the present disclosure can fix the battery module 300 to the case 200 through the fixing frame 100, and the reliability of the connection between them can be ensured even if it is subjected by an external impact force and vibrates. Since the battery module 300 is connected to the case 200 by the fixing frame 100, the battery module 300 does not vibrate up and down, and thus does not cause relative movement of the single battery inside the battery module 300 to ensure the safety of the battery pack itself. At the same time, since the recess portion 21 of the connecting component 20 can be provided between the adjacent two battery modules 300 to separate the adjacent two battery modules 300, when the battery pack itself is partially impacted, the recess portion 21 can prevent the mutual impact between the two adjacent battery modules 300, and prevent the impact force from being transmitted between multiple battery modules 300 inside the battery pack, thereby effectively preventing damage to multiple battery modules 300 and ensuring safety performance and service life of the battery pack.

Although the present disclosure has been described with reference to the preferred embodiments thereof, various modifications may be made thereto and the components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A battery pack, comprising:
    a case comprising a receiving cavity and a side wall enclosing the receiving cavity;
    a battery module provided in the receiving cavity;
    a fixing frame for fixing the battery module, comprising:
    a top connecting frame comprising two or more fixing plates spaced apart from each other in a first direction and a connecting component connecting the two adjacent fixing plates, the connecting component comprising a recess portion and an adapter portion connected to each other, the recess portion being recessed in a second direction and the adapter portion being connected to both sides of the recess portion in the first direction, and the connecting component being connected to the two adjacent fixing plates via the adapter portion; and
    locking plates provided on both sides of the top connecting frame in the first direction and extending along the second direction, the locking plate comprising a first end and a second end in the second direction, and the first end being connected to the top connecting frame and the second end being connectable to an external structural member; wherein the first direction intersects the second direction, and the top connecting frame is pressed against the battery module, the locking plate is connected to the side wall by the second end, and the connecting component is located between two adjacent battery modules to separate two adjacent battery modules.

2. The battery pack according to claim 1, wherein the connecting component further comprises a buffer portion, and the buffer portion is a bent body formed by the side plate bending in the second direction.

3. The battery pack according to claim 1, wherein a gap is reserved between the connecting component and an adjacent battery module, and/or there is a gap between the locking plate and adjacent battery module.

4. The battery pack according to claim 1, wherein the length of the fixing frame in a third direction is greater than or equal to one third of the length of the battery module in the third direction, and the third direction is perpendicular to both the first direction and the second direction.

5. The battery pack according to claim 1, wherein the recess portion comprises a bottom plate and side plates, the side plates are spaced apart from each other in the first direction and connected to the bottom plate, the adapter portion has a plate-like structure and is connected to the side plate, and the bottom plate is connectable to the external structural member.

6. The battery pack according to claim 5, wherein the connecting component further comprises a reinforcing portion, the reinforcing portion is connected to the side plate, and the reinforcing portion, the bottom plate and the side plates enclose a buffer space.

7. The battery pack according to claim 6, wherein the connecting component further comprises a buffer portion, and the buffer portion is a deformable buffer body filled in the buffer space.

8. The battery pack according to claim 5, wherein the bottom plate and the second end are in the same plane, the bottom plate is provided with a first connecting hole through the bottom plate in the second direction, and the second end is provided with a second connecting hole through the second end in the second direction.

9. The battery pack according to claim 8, wherein at least one of the top connecting frame and the locking plate is provided with a lightening hole and/or a reinforcing rib.

* * * * *